Patented June 29, 1943

2,323,118

UNITED STATES PATENT OFFICE 2,323,118

FLOOR COVERING AND METHOD FOR MAKING THE SAME

Solomon Caplan, New York, N. Y., assignor to The Harvel Corporation, a corporation of New Jersey No Drawing. Application October 25, 1939, Serial No. 301,194

2 Claims. (Cl. 106—232)

The present invention relates to compositions, compounds, mixtures and materials generally for use as coverings, for floor, work benches and so on in the form of sheets, tiles and blocks and comprising cashew nut shell liquid as an essential ingredient and in which the cashew nut shell liquid has been modified to a thickened state by heating or by polymerization or by condensation with another material, for example, an aldehyde such as formaldehyde, hexamethylene tetramine, paraformaldehyde and furfuraldehyde, or thickened by combinations of two or more of these methods. And the present invention relates further to methods and steps for making and using the products of the present invention.

One example for making a composition of the present invention is as follows. Cashew nut shell liquid which has been polymerized to the consistency of thick molasses is mixed with about equal parts of "cumar" resin and about 8 percent of the weight of the polymerized cashew nut shell liquid of hexamethylene tetramine and sheeted out on a rubber mixing roll to a predetermined thickness, for example to about one-quarter of an inch. The polymerized cashew nut shell liquid and the hexamethylene tetramine are reacted to a predetermined degree by heating at about 275° F. for a few hours, the length of time being determined by the hardness desired such as a hardness which gives a penetration of 1 to 2 in 5 seconds with a hundred gram weight at about 77° F. Some or all of the heating can be accomplished while the material is being mixed or sheeted on the rubber mixing rolls. The sheeted material can then be cut up into desired size sheets or into the small size tiles and can be applied and secured to floors, work benches and the like by means of rubber cement, asphaltum, or other adhesives generally used for fastening sheet and tile floor coverings to floors.

Another example of material for use in the practice of the present invention is as follows. Sixty parts by weight of water white rosin were heated to 400° F. at which temperature 3.6 parts of hydrated lime were added slowly with stirring. After the lime was all added the temperature was raised to about 500° F. and held for about 15 minutes after which 40 parts by weight of cashew nut shell liquid were added and stirred in well to get a homogeneous mixture, the temperature falling to about 400° F., whereupon about 18 parts by weight of paraffin oil were added and stirred in, the temperature falling to about 350° F. When this mixture had cooled to about 200° F. about 11 parts by weight of U. S. P. formalin (about 40% solution of formaldehyde in water) were added and stirred in. Heat was again applied to bring about condensation of the cashed nut shell liquid and formaldehyde and to drive off the water, the mixture being stirred continuously and the temperature finally brought to about 250° F. This composition was then cured for about 16 hours in an oven at about 275° F. to promote polymerization of the condensation product of the cashew nut shell liquid and the formaldehyde. The cashew nut shell liquid used in this reaction was one from which the metals of naturally occurring salts were precipitated and removed.

The material of this example when sheeted out has the following characteristics: thermoplastic but not thermo setting; remains at substantially the same hardness after repeated heating at about 250° F.; has slow softening characteristics as determined by the following penetration values at the given temperatures:

| Penetration in five seconds | Under weight of— | At temperature of— |
|---|---|---|
| Cm./100 | Grams | °F. |
| 1 to 2 | 100 | 77 |
| 6 to 8 | 50 | 115 |
| 40 to 60 | 50 | 150 | and a ball and ring fusion point at 180° F. to 200° F.; has resistance to water and soap solutions; has little or no odor; and is fairly light in color.

Another example is similar in composition, weights and method of handling to the second example except that East India chips Congo gum are substituted for the WW rosin and the initial melting or starting temperature is at about 300° F., and in place of the formalin there is used hexamethylene tetramine in amount about eight per cent of the weight of the cashew nut shell liquid. In this case the ammonia of the hexamethylene tetramine serves as a catalyst for the condensation of the cashew nut shell liquid and the methylene group; in the previous example the lime of the limed rosin serves as the catalyst for the condensation of the cashew nut shell liquid and the formaldehyde.

In the examples where paraffin oil is used paraffin wax can be used in place thereof when other hardness characteristics are required.

The compositions of the above examples are adapted for use sheeted out for floor covering in the form of sheets, blocks or tiles, also they are adapted for compounding and mixing with other materials such as rubber, sulphur, factis, "cumar," stearine pitch, mineral pitch, tar, jelled China-wood oil and so on for the same purpose of making floor coverings in the form of sheets, tiles, blocks and so on. All these compositions, compounds, mixtures and so on can have fillers and pigments intermixed with them for toughening, coloring or other purposes, examples of fillers and of pigments being asbestos, cork, talc, zinc oxide, purple iron oxide, slate dust of various colors, wood fiber and flour and so on.

An example of the use of a filler and a pigment is as follows: About two parts by weight of the material of the second example, one part of red iron oxide and one part wood flour are put on a rubber mill and masticated together, the back roll being kept cool with running water and the front roll hot with hot water or steam. After a suitable degree of mixture is obtained the material is sheeted out to a predetermined thickness and trimmed to desired sized sheets or tiles.

The cashew nut shell liquid materials used in the above example and others suitable in the practice of the present invention are those described in patents of Mortimer T. Harvey, Numbers 1,725,791, 1,725,792, 1,725,793, 1,725,794, 1,725,795, 1,725,796, 1,725,797, 1,771,785, 1,771,786, 1,819,416, 1,838,071, 1,838,072, 2,067,919, and other Harvey patents some of which are noted in the above specifically designated patents.

The present application is a continuation in part of my copending application Serial Number 150,158, filed June 24, 1937.

Having thus described my invention, what I claim and desire to protect by Letters Patent is:

1. The method of making a permanently thermo-plastic floor covering comprising heating a mixture of cashew nut shell liquid, an aldehyde, an alkaline catalyst and a resin selected from the group consisting of "cumar" resin, rosin and East India chips Congo gum, the quantity by weight of said resin being at least as great as the quantity by weight of said cashew nut shell liquid, said alkaline catalyst being capable of promoting condensation of cashew nut shell liquid and the aldehyde upon application of heat.

2. A thermo-plastic floor covering comprising a resin selected from the group consisting of "cumar" resin, rosin and East India chips Congo gum, and the organic condensation reaction product of cashew nut shell liquid and an aldehyde, the quantity by weight of said resin being at least as great as the quantity by weight of said cashew nut shell liquid.

SOLOMON CAPLAN.